United States Patent [19]

Adiga et al.

[11] Patent Number: 5,892,913
[45] Date of Patent: Apr. 6, 1999

[54] SYSTEM AND METHOD FOR DATASTREAMS EMPLOYING SHARED LOOP ARCHITECTURE MULTIMEDIA SUBSYSTEM CLUSTERS

[75] Inventors: Ashok Kakkunje Adiga, Austin; Michael Norman Day, Round Rock; Kenneth Adam Kalinoski, Austin; Dale Arthur Legband, Pflugerville; Wade David Shaw, Austin; Daniel Charles Wolfe, Tucson; Donald Edwin Wood, Austin, all of Tex.

[73] Assignee: International Business Machines Corporation, Armonk, N.Y.

[21] Appl. No.: 755,874

[22] Filed: Dec. 2, 1996

[51] Int. Cl.[6] .............................. G06F 17/00; G06F 9/00; G06F 15/163
[52] U.S. Cl. .............................. 395/200.49; 395/200.55; 395/200.61; 395/200.68; 395/200.65
[58] Field of Search ........................ 707/1, 104; 370/447, 370/445, 452, 462, 404, 405; 395/200.48, 200.49, 200.61, 312, 824, 821, 825; 348/7

[56] References Cited

U.S. PATENT DOCUMENTS

| | | |
|---|---|---|
| 4,924,303 | 5/1990 | Brandon et al. . |
| 5,387,927 | 2/1995 | Look et al. . |
| 5,388,264 | 2/1995 | Tobias II et al. . |
| 5,390,138 | 2/1995 | Milne et al. . |
| 5,412,416 | 5/1995 | Nemirofsky . |
| 5,440,336 | 8/1995 | Buhro et al. . |
| 5,450,411 | 9/1995 | Heil . |
| 5,481,542 | 1/1996 | Logston et al. . |
| 5,495,283 | 2/1996 | Cowe . |
| 5,625,405 | 4/1997 | Dulac et al. ................................. 348/7 |
| 5,737,747 | 4/1998 | Vishlitzky et al. ...................... 711/118 |
| 5,754,871 | 5/1998 | Wilkinson et al. ...................... 395/800 |

OTHER PUBLICATIONS

James Martin, Local Area Networks, p. 41, Prentice–Hall, ISBN 0–13–539644–1.

*Primary Examiner*—Glenton B. Burgess
*Assistant Examiner*—Chris Tanner
*Attorney, Agent, or Firm*—Robert M. Canwell

[57] ABSTRACT

In order to increase the number of datastreams provided by a multimedia system, a cluster of clusters of multimedia A/V server subsystems is provided. Each cluster in turn is comprised of a plurality of A/V servers, a shared loop architecture plurality of data storage devices interconnected to the A/V servers whereby any storage device is substantially equally accessible by any of the servers in the cluster; and a highly available control server subsystem interconnected to the A/V servers and the data storage devices for controlling the A/V servers and the data storage devices. Each of the clusters is interconnected to a high speed switch for delivery of datastreams from the cluster to the end user. One of the control server subsystems also serves as a master control server assigning a request for a datastream to one of the clusters.

8 Claims, 6 Drawing Sheets

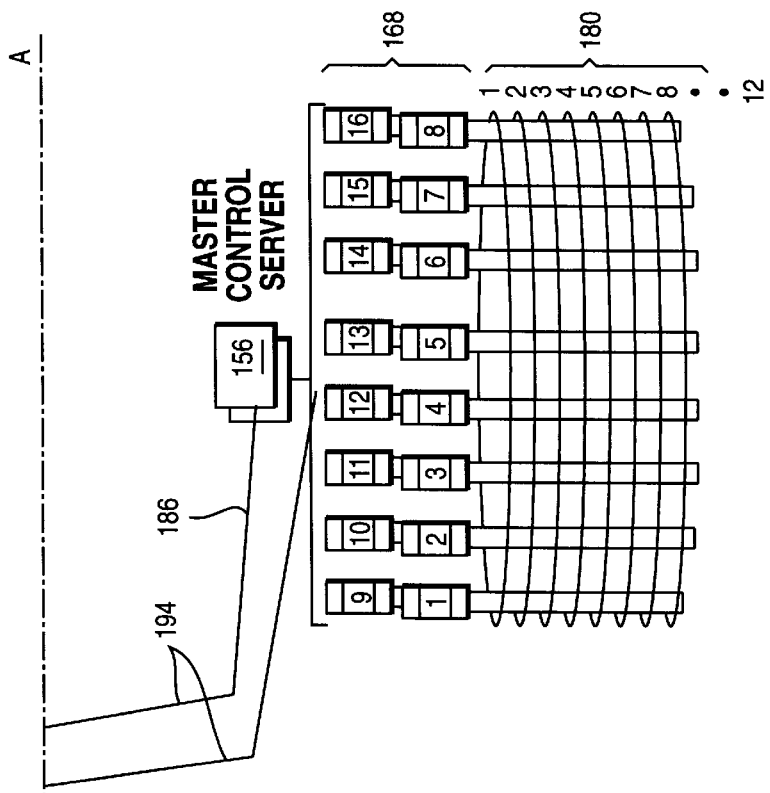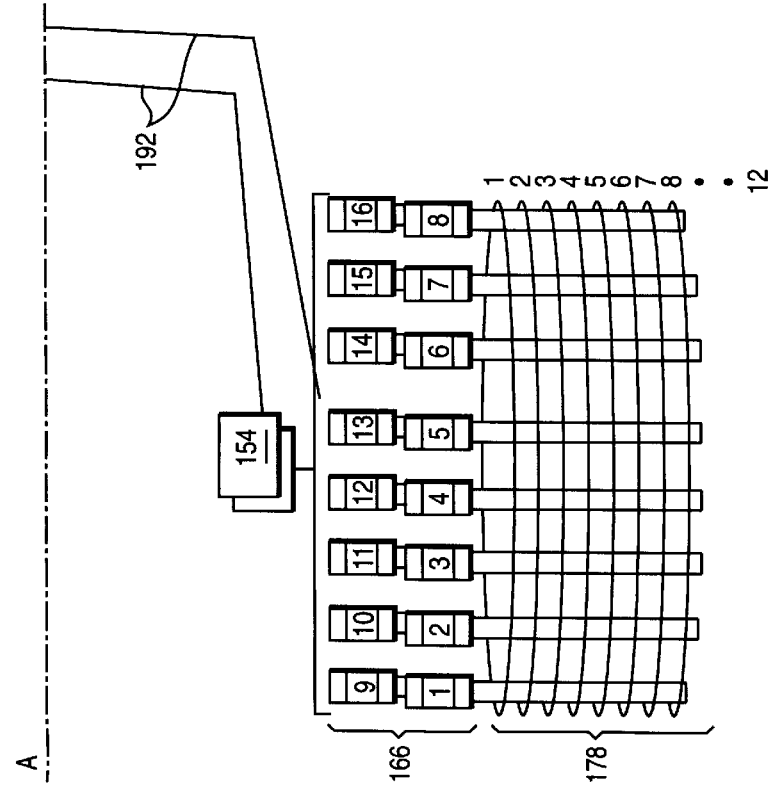
FIG. 6B

SYSTEM AND METHOD FOR DATASTREAMS EMPLOYING SHARED LOOP ARCHITECTURE MULTIMEDIA SUBSYSTEM CLUSTERS

CROSS REFERENCE TO RELATED APPLICATIONS

The present invention appears to claim subject matter disclosed in co-pending application, Ser. No. 08/755,863 IBM Docket AT9-96-060, filed on Dec. 2, 1996.

TECHNICAL FIELD

This invention relates to computerized systems for serving audio and video data and, more particularly, to such systems having improved data storage and handling.

BACKGROUND OF THE INVENTION

Along with the phenomenal growth of the multimedia industry has come the emergence of sophisticated computerized audio/video server systems which must deliver large numbers of individualized datastreams to a huge customer set in a cost effective manner. Compounding this problem is the fact that with the relatively insatiable desire for variety of content, not only must large numbers of media streams be handled, but it is highly desirable that they be available on an almost instantaneous basis and readily selectable at the customer's whim from a huge content base of titles and clips, with multiple customers often desiring to view the same title at the same time.

An example of an application of such systems is information kiosks in shopping malls, museums, etc., but perhaps an application more representative of the myriad technical problems which arise in delivery of such a system is in the case of video-on-demand systems. Such systems are called upon to deliver simultaneously to thousands of customers their individualized selection of movie titles to view on an almost instantaneous demand basis, wherein the movie titles may be selected by a customer from a list numbering in the thousands. Multimedia data is notoriously extremely dense. For example, storage of a single full length movie may require 5 gigabytes, and playback of a video stream of the title typically may be at a 20 megabyte per second rate. Moreover, a video-on-demand service might be expected to service thousands of customers, each with the ability to select their own "customized" uninterruptable 20 megabyte per second video stream simultaneously selected from a video database comprising perhaps $10^{14}$ bytes (e.g., 100 gigabytes per title times 1,000 titles). The sheer magnitude of these numbers intuitively raises the serious and troublesome questions now plaguing the industry regarding how such systems may be delivered on an efficient and cost effective basis.

Subtleties which may escape an initial analysis of the incredibly complex problems presented by the demand for such systems only serve to compound the difficulties. As but one example of this, in the case of video-on-demand movie servers, it cannot be assumed that there will be an even distribution of demand for all the titles. On the contrary, at various times a given title may be considered to be extremely popular and requested for viewing by a high percentage of customers, thereby placing a demand on a disk drive controller which simply cannot be met given the bandwidth limitations of the controller.

One solution to this problem which might readily come to mind is simply to replicate the title on additional disk drives and controllers, however this approach is unacceptable for several reasons. First, one of the most significant costs in such an audio/video server system is the storage costs. Thus, it may be prohibitive to simply replicate titles on multiple disks. Moreover, the demand for titles in such systems is not static, but rather dynamically changing over time, e.g., a title which is relatively "hot" at one time may experience diminished demand in a few days, only to be replaced by yet another title. Thus it becomes extremely difficult to efficiently balance the loading of such systems when it is necessary to continually be replicating copies of titles on various disk drives, not to mention the previously described unacceptable cost associated with replication of titles.

The foregoing problems may perhaps be best illustrated with reference to FIG. 1 which is a simplified illustration of one conventional implementation of a video server system. In such a system, a plurality of servers 18, 20, 22 are provided which may take the form of RAID controllers well known in the art such as RAID 4 or 5 controllers which offer data loss protection. Each such controller may control a corresponding dedicated number of disk drives on the order of perhaps 30 or 40 per controller organized in raid arrays. Thus, controllers 18, 20, 22 would control their respective plurality of disk arrays 19, 21, and 23, respectively, each array containing digitized video data such as titles T shown in FIG. 1, typically on 4 disk drivers with an additional drive for parity.

Interconnecting each of the controllers 18–22 is a fiber channel arbitrated loop 10 and a redundant loop 12 (the data loss protection afforded by the raid controllers and the redundant loop are present due to the need in such systems for high availability). Each of the respective controllers 18–22 delivers on respective line 24A, 24B, 24C, streaming video from their respective disk arrays 19, 21, 23, respectively, such as an ATM streaming video in MPEG 2 format well known in the art, such streaming video being delivered to an appropriate ATM switch 14 also well known in the art. Interconnected to the switch 14 is a cable network 13 serving a plurality of video/audio controllers or computers or televisions 16 for example, only one of which is shown for simplicity.

In a simplified operation, if a request is made for title T, the controller 20 will deliver the video stream from one of the corresponding dedicated drives 21 on which the title resides through the controller 20, onto the line 24B, through the ATM switch 14, out cable connection 13 to be viewed by the customer on the monitor 16. In such a simplified case, the system may work very well. However, as aforementioned, the title T may be in great demand and thus saturate the bus, inasmuch as a given raid controller such as controller 20 may only handle a finite number of such streams. In such an eventuality, the fiber channel loop 10–12 comes into play. The title T may be transferred over the loop 10–12, statically by an operator, e.g., not on demand, to a next disk controller 22 and replicated as T' in one of the corresponding disk drives 23 associated with controller 22. In this manner, an additional complement of video streams of the title may be provided by the controller 22 on line 24C, deriving from the replication of title T on controller 22's disk drive as the redundant title T'.

Several significant problems are associated with implementations of such video controller systems of FIG. 1. First, it will be recalled that video titles require huge amounts of storage and thus the cost of disk storage 19–23 is typically a major part of the cost of the entire system. Thus, in order to satisfy demand for video streams in excess of that which can be provided by a given controller 18–22, it is generally unacceptable to simply replicate the title as T' on another disk drive inasmuch as this requires redundant and expensive copies of the data. An inherent weakness of the system of FIG. 1 relates to the fact that each controller 18–22 may only access its own set of respective local disks 19, 21, 23, necessitating transfers of titles across the ring 10–12.

Yet another problem associated with the systems of FIG. 1 is that even if the expense of replication of titles might somehow be acceptable, it can readily be appreciated that given a particular demand for titles, the ring 10–12 may itself become congested in transferring video data from respective disk storages of one controller to that of another, thereby adding unacceptable overhead to the process. Moreover, the various disk drives 19–23 typically may have a larger bandwidth than the number of streams which a given controller associated with the particular disk drive may be able to handle. Thus, in the system of FIG. 1 the bandwidth of the expensive disk drives is essentially constrained by the bandwidth of their respective servers and controllers in a number of streams 24A–24C which each respective controller 18–22 may be able to deliver. The design of the system is inherently and expensively unbalanced in that each of the expensive disks should be "milked" to take advantage of the full capability of its read head bandwidth without constraining it by its respective controller.

In interactive video systems with differing mixes of demands of the various titles, in such a system as that of FIG. 1 it will be apparent that a daunting task arises for someone to be able to predict demand and prebalance clips on the various disk drives 19–23 to meet the varying loads and to reduce congestion on the arbitrated loop 10–12. In one such attempt to do so, systems may add a switch controller 11 seeking to balance in some intelligent fashion the distribution of titles across the disks 19–23. However, such systems are extremely expensive due to switch logic for hundreds of disks and still exhibit the aforementioned problems of unbalanced systems which can arise very quickly. Also there is a single point of failure so two switches must be provided. In short, a significant problem of the system of FIG. 1 is that the expensive disk drives are local or private to their respective controllers and the fast fiber channel loops 10–12 are disposed on the front end of the system interconnecting the controllers 18–22 only to facilitate moving data over the arbitrated loop between processors. This gives rise to the undesirable less-balanced and more expensive characteristics of the system.

In yet another approach to solving the aforementioned thorny problems, the system of FIG. 1 provides a crossbar switch 36 or other type interconnecting switch interposed between a plurality of disk controllers 30, 32, 34, and various disk arrays, 38, 40, 42, 44, which have stored therein the video data. Thus, unlike the system of FIG. 1, the system of FIG. 2 enables any controller 30, 32, 34, to access a title on any of the disk arrays 38, 40, 42, 44, by means of the crossbar switches 36. Thus, while such a system avoids the expensive practice of maintaining redundant copies of titles in that any controller can access any disk, unfortunately in many applications the cost per stream in a system such that of FIG. 2 becomes prohibitive. This is a direct result of the excessive cost of such high interconnect and redundancy crossbar switches 36, considering the fact that given the large number of datastreams, a correspondingly large number of the expensive crossbar switches 36 are required.

SUMMARY OF THE INVENTION

In order to increase the number of datastreams provided by a multimedia system, a cluster of clusters of multimedia A/V server subsystems is provided.

Each cluster in turn is comprised of a plurality of A/V servers, a shared loop architecture plurality of data storage devices interconnected to the A/V servers whereby any storage device is substantially equally accessible by any of the servers in the cluster; and a highly available control server subsystem interconnected to the A/V servers and the data storage devices for controlling the A/V servers and the data storage devices. Each of the clusters is interconnected to a high speed switch for delivery of datastreams from the cluster to the end user. One of the control server subsystems also serves as a master control server assigning a request for a datastream to one of the clusters.

BRIEF DESCRIPTION OF THE DRAWINGS

FIGS. 6A and 6B are drawings of a 5 cluster system in accordance with the invention, each cluster containing 16 video service nodes and 352 4.6 disk drives interconnected so as to be shared by all 16 nodes of the cluster.

DETAILED DESCRIPTION OF THE PREFERRED EMBODIMENT

Figure 3:
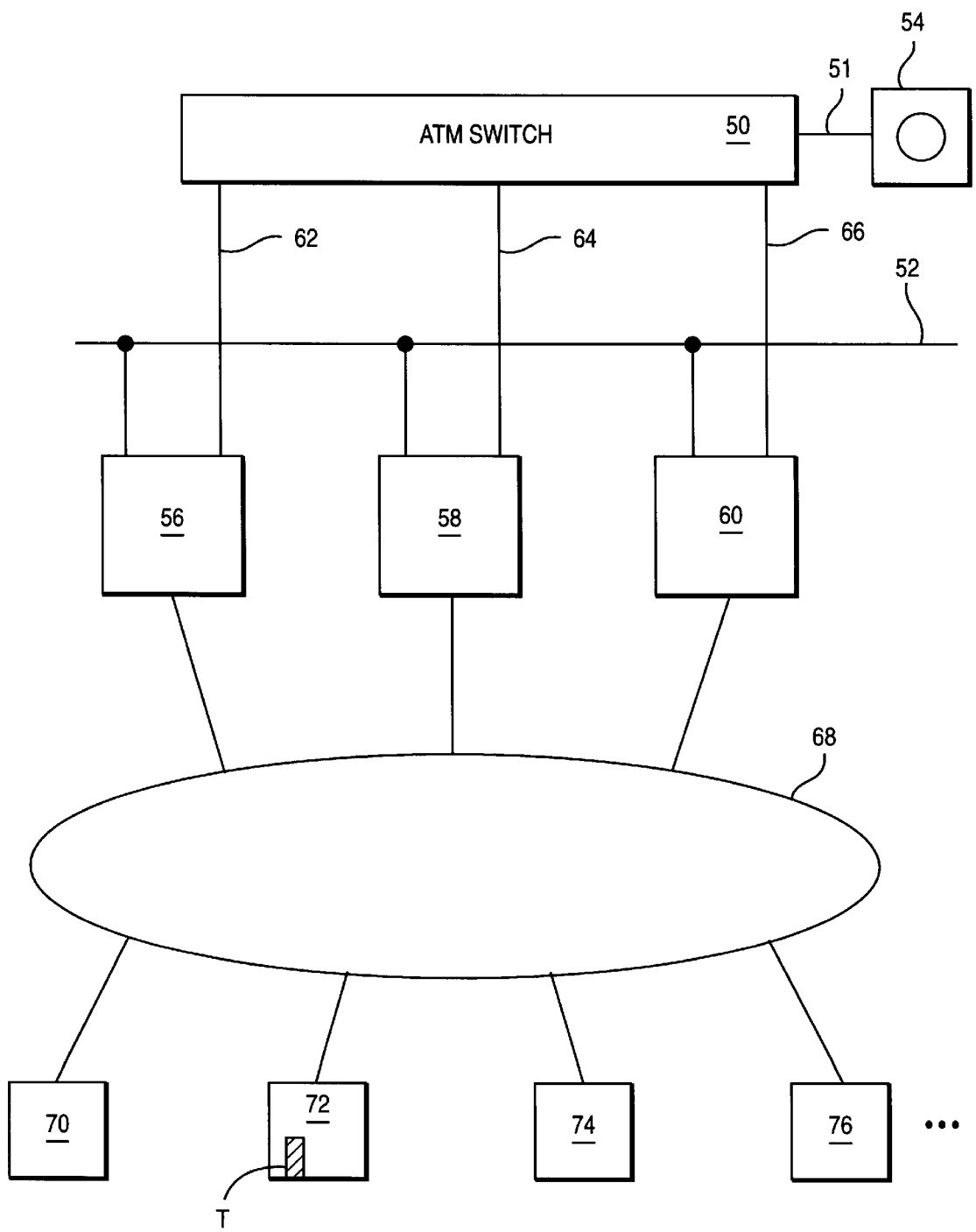
FIG. 3 is a functional block diagram of one implementation an audio/video server system of the invention employing a shared storage loop.

Turning now to FIG. 3, depicted therein is one implementation of an audio/video server system of the invention. In comparison with the prior art system of FIG. 1, certain similarities are readily apparent. First, an appropriate switch such as an ATM switch 50 is provided interposed between a plurality of display terminals such as television sets 54 and a plurality of servers or controllers 56, 58, 60. Each controller is interconnected to the switch 50 by its respective data stream line 62, 64, 66. Also similar to the system of FIG. 1, a plurality of disk drive arrays 70, 72, 74, 76, are provided wherein titles such as T are digitally stored therein.

Figure 1:
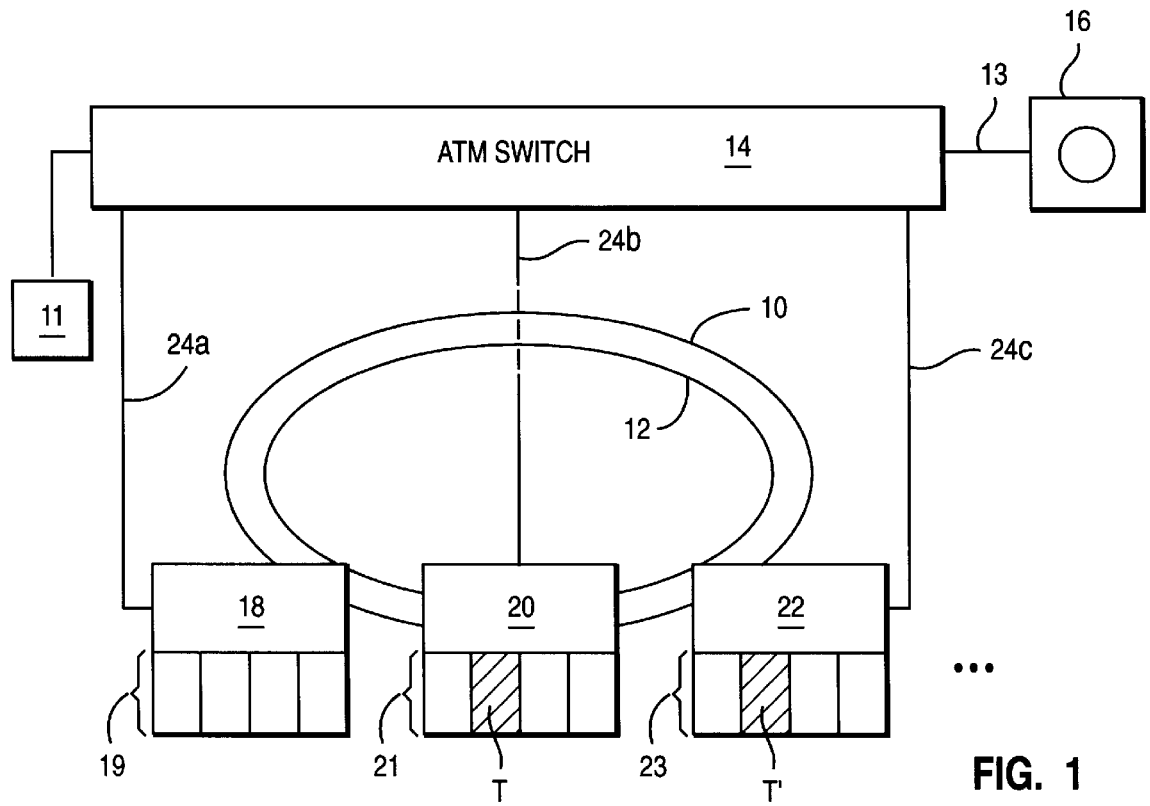
FIG. 1 is a functional block diagram of an audio/video server system of the prior art, employing fiber channel arbitrated loops interconnecting disk controllers.

However, a closer comparison of FIGS. 1 and 3 reveals a fundamental distinction. It will be noted that the fiber channel arbitrated loop 10–12 of FIG. 1 is dispensed with which interconnected the controllers 18–22. In contrast, in the system of the invention depicted in FIG. 3, a serial storage architecture (SSA) or fiber channel arbitrated loop (FC-AL) 68 is provided interposed between the controllers 56–60 and the disk arrays 70–76. The important significance of the introduction of the loop 68 between the controllers 56–60 and the disk arrays 70–76 is that, unlike the case of the system of FIG. 1, these expensive disk arrays, by means of the loop 68, are no longer dedicated or local to respective controllers, but rather are readily available by means of the loop 68 to any controller 56–60.

Thus, in operation, if a title T is desired to be viewed by a user on the display 54, this video stream may essentially be provided by any of the controllers 56–60 from the same disk 72 on which the title T resides. The demand may therefore be serviced by the stream from disk 72 being delivered across loop 68 to controller 56, through line 62, switch 50, cable connection 51, to display device 54. Similarly, the path could be from disk 72 through loop 68, controller 58, line 64, switch 50, cable connection 51 to display 54. In like manner, the demand could be serviced along the path from disk 72 through loop 68, controller 60, line 66, switch 50, cable connection 51, to display device 54.

More importantly, however, it is important to note that the demand for this same title T may be serviced simultaneously through the three aforementioned paths (e.g., through controller 56, 58, and 60) without necessitating the expensive replication of the title on another disk array 72, 74, or 76 (compare the case of the system of FIG. 1 wherein the title T on disk array 21 had to be replicated on disk array 23 as title T').

As will be recalled, the bandwidth of a given disk drive 70–76 typically may exceed the datastream handling ability of a given controller 56–60. For example, the bandwidth of the drive 72 may be able to deliver 60 or more datastreams of the title T, whereas a given controller 56, for example, may only be able to handle 30 datastreams. It will be recalled that this problem is what gave rise to the necessity for replicating the title on a different controller in the system of FIG. 1 (so that this other controller 22 could deliver the additional required datastreams itself from its dedicated disk 23 on which the replicated title T' was stored) However, it will noted in the system of FIG. 3, that this demand for data streams in excess of the capability of a given controller may now be spread throughout a plurality of controllers without necessitating replication of the content itself, e.g., copying the title T in an expensive and overhead-intensive manner to one or more of the remaining disks 74–76. As a result of this innovation, (unlike the case of FIG. 1 wherein the potential arose for congesting the loop 10–12 with transfers of title data thereon to the various controllers) this burden need not be placed on the loop 68.

It will be appreciated that the various controllers 56–60 must be coordinated and interconnected as in the case of the controllers 18–22 of FIG. 1. However, referring again to FIG. 3, this control loop 52 may be provided by an Ethernet loop well known in the art rather than necessitating a high speed fiber channel loop as in the case of the system of FIG. 1. The reason for this is that the relatively slower loop connection 52 such as that provided by an Ethernet, may be adequate because unlike the case of FIG. 1, a great deal of video data is not being placed upon the loop 52 (since essentially it is only performing the function of control and coordinating the various processors 56–60). Thus, the loop 52 need not be as high a performance loop as that of arbitrated loop 10–12 in the case of the system of FIG. 1.

In summary then, in the case of system 1, the disks 70–76 are shared by all of the processors 56–60 in a cluster. Moreover, only as many drives 70–76 are required to hold titles as are required or limited by the bandwidth of the particular disk drive (e.g., the number of video streams that a given disk can handle). This is in recognition of the fact that modern day processors 56–60 may saturate quickly in terms of the number of video streams they may handle whereas a given disk drive 70–76 may nevertheless have remaining bandwidth left over to service another such processor with the identical video stream (e.g., the same title T). Also, in the system of FIG. 3, because any given controller can essentially access a title T with similar overhead via the SSA or FC-AL loop 68, the demands to balance the titles over the disk arrays are not as demanding as in the case of the system of FIG. 1.

Figure 4:
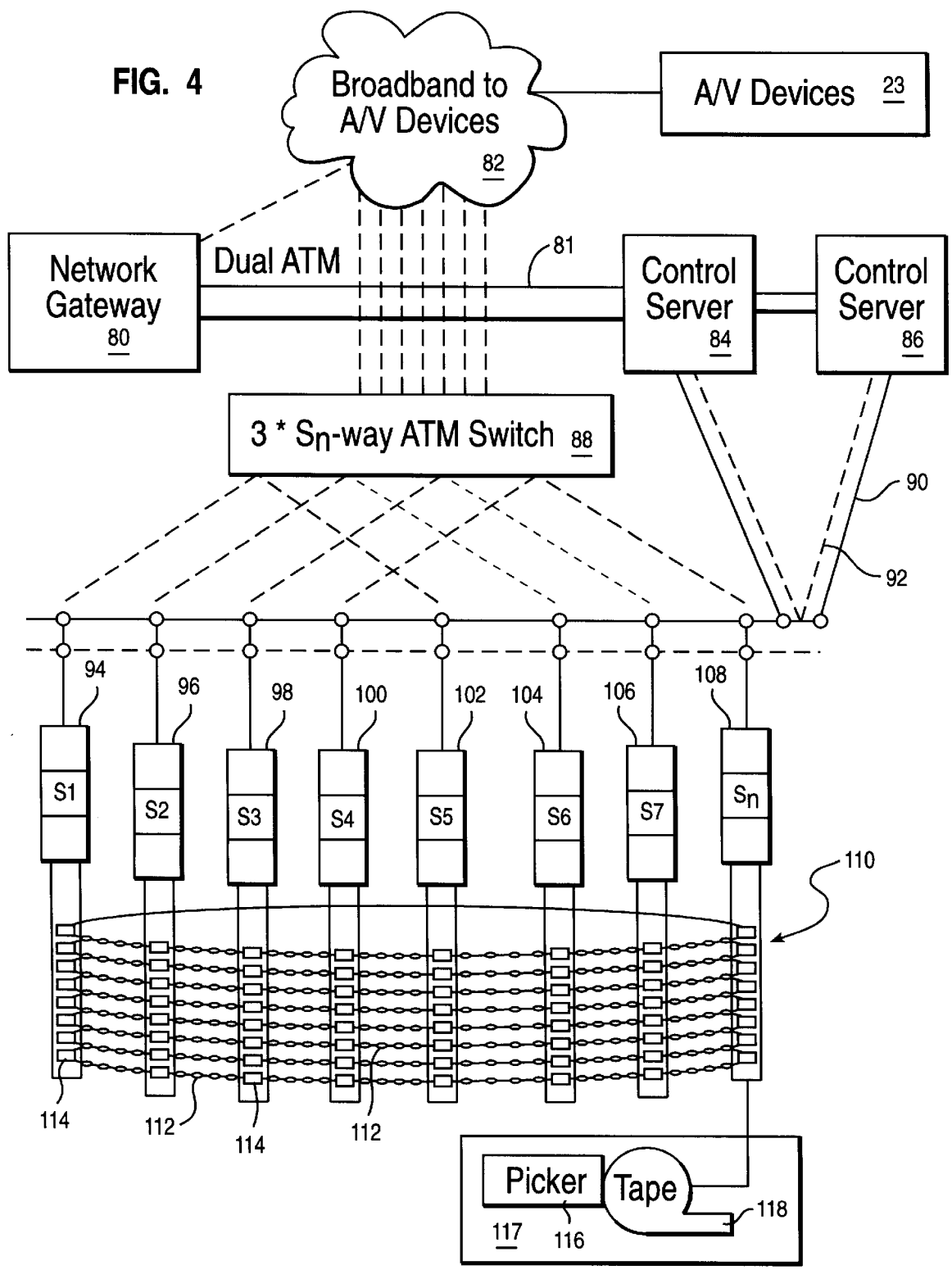
FIG. 4 is a more detailed functional diagram of the system of FIG. 3.

Having now completed a high level description of the system of FIG. 3 from which an understanding of the invention may be gained, reference is now made to a more detailed illustration of the system in FIG. 4 which will reveal in comparison many similarities to FIG. 1. The essential elements of the system of FIG. 4 may be now be described.

Figure 2:
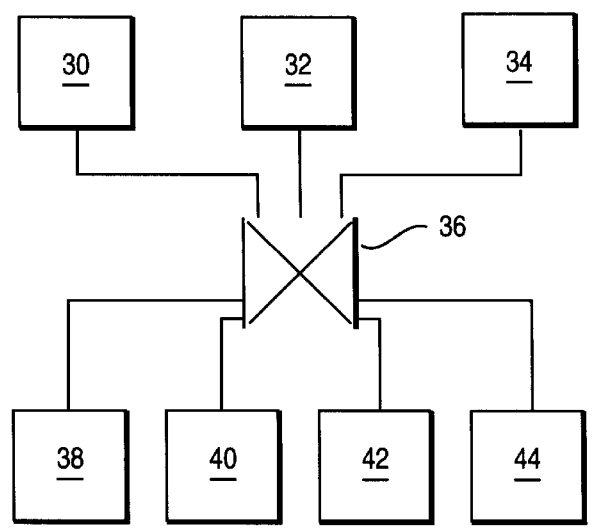
FIG. 2 is a functional block diagram of yet another audio/video server system of the prior art employing crossbar switches for selectively interconnecting a given controller to a desired storage device.

In the simplified illustration of FIGS. 1–3, only three servers or controllers were shown. The invention is not intended to be so limited. Accordingly, in FIG. 4, one or a cluster of essentially any desired number of audio/video server computers 94–108 may be provided which access a pool of disks via shared loops shown generally as reference numeral 110 looped in accordance with serial storage architecture (SSA) or fiber channel arbitrated loop (FC-AL) standards. In a particular embodiment, although the invention is not intended to be so limited, 1 to 32 computing nodes may be provided by the computers 94, 108, comprised of a corresponding 1 to 8 CPUs, with 3 ×ATM 155 megabyte adapters, 2×SSA adapters or 4×FC-AL loop adapters.

An isochronous (e.g., guaranteed bandwidth) connection (implemented in the system of FIG. 4 as an ATM switch and network, 88) is provided between the servers 94–108 and a set of audio/video devices 83 delivered by a broadband channel 82. In the alternative, analog output may be selected and provided in a conventional manner. These audio/video (A/V) devices 83 may include, but are not limited to televisions, television control adapters (set top boxes) personal computers, and information kiosks. For generality, users of such A/V devices 83 may be referred to herein as viewers regardless of whether they are listening, viewing, or both.

Continuing with FIG. 4, a plurality of disk drives 112 are provided in the loops 110 represented in the figure as small ovals. Additionally, a set of loop adapters 114 are provided represented as black rectangles in FIG. 4 which connect each computer 94–108 to each loop of the disk communications loop 110. Typically these would be SSA or FC-AL adapters dependent upon which loop architecture for the loop 110 is adopted.

Stored media titles are preferably divided into thousands of data blocks, each in the implementation herein described of a size at least 256K bytes. Preferably, individual data blocks are not stored on a single disk 112, but rather are placed in a balanced fashion across many or even all of the available disk drives 112 on the shared loops 110. This permits any stored title to be played simultaneously by a large number of A/V devices 83 without overloading any single drive 112 or server 94—108. Whereas for illustrative purposes the content on the drives 112 has been described as video or movie data, the invention is not intended to be so limited. Essentially any multimedia, audio, video, or audio/video titles or clips may be stored on the shared disk drives 112 and in any of a number of digital standard formats including, but not limited to MPEG 1, MPEG 2, and motion JPEC. Connection from any of these titles to any such A/V device 83 may thus be made from any of the servers 94–108 through the isochronous connection 88–82.

A pair of redundant, fault-tolerant control servers in a computing cluster 84–86 are further included for, as but one function, controlling the servers 94–108. However, control commands may also be set essentially by any type of computer or input mechanism capable of communicating title selection and play control commands to the servers 94–108. Either the control server 84–86 or the A/V servers 94–108 may perform the additional function of balancing the computer load among the servers as previously noted. A program executing in the control servers 84–86 also performs the additional function of determining whether new media selection requests can be played without pauses, gaps, or excessive loss of quality of service (QOS) to the viewer. If they cannot be so played, the control servers will delay the request. In the alternative, the programs associated with the control server could reside on one or more of the A/V servers 94–108.

One or more archive servers 108 preferably may be interconnected to a robotic media archiving system 117 comprised of a magnetic tape or CD ROM media 118 and a picker 116 for selecting and playing back tapes or CD ROMs in the subsystem 117 in response to commands from the archive server 108. The archive server 108 will provide the function of loading new titles onto the disks 112 of the loops of the shared loop 110. Two more clusters may be connected to the archive server 108 if desired.

Figure 5:
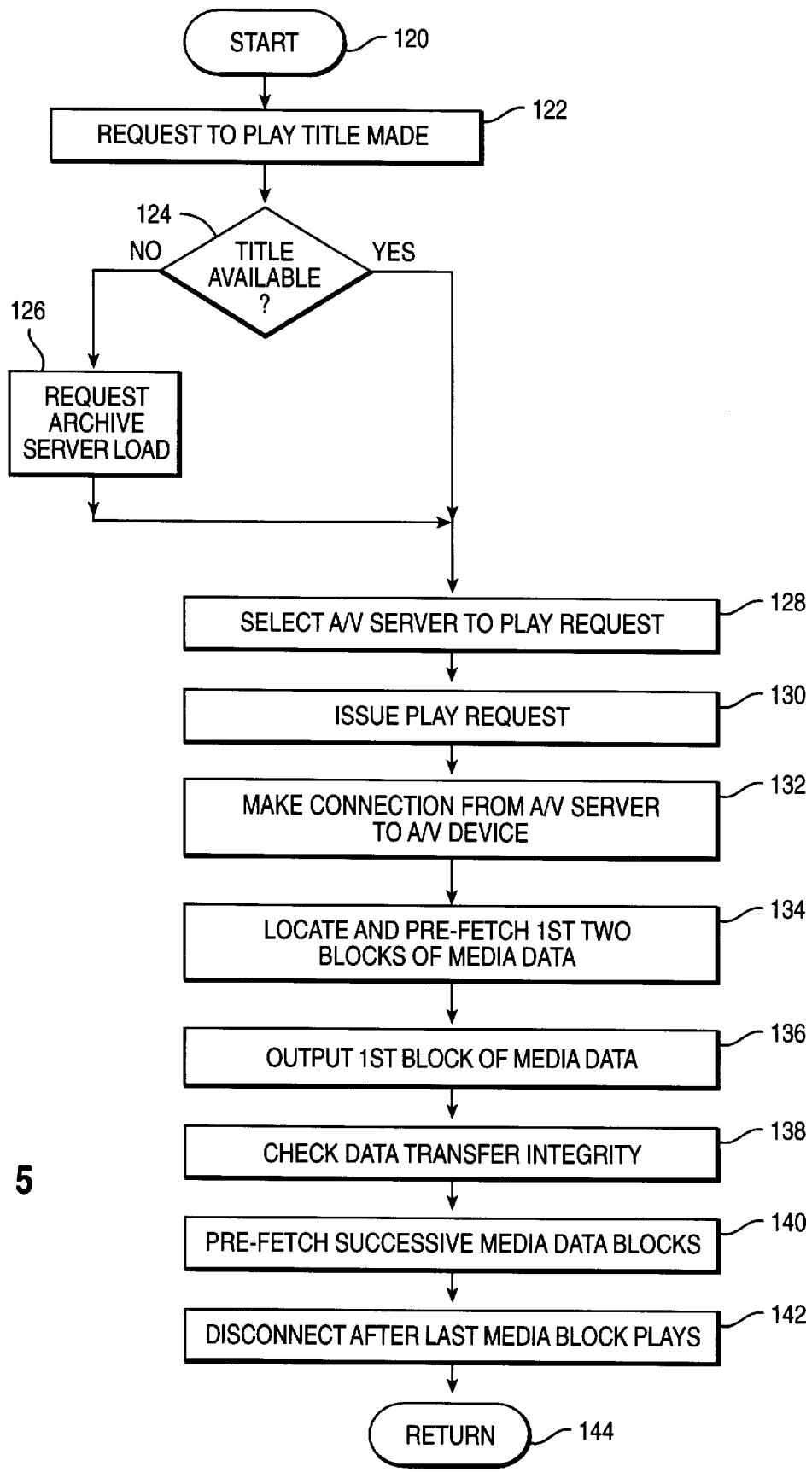
FIG. 5 is a flow diagram illustrating the operation of the systems of FIGS. 3 and 4 of the invention.

The operation of the preferred sequence of events of the system of FIG. 1 may be more clearly understood now with reference to the flow diagram of FIG. 5. This flow diagram may be implemented in program code executing on the control servers 84–86 or A/V servers 94–108 and cause execution of the following steps. The control routine is entered at 120, whereupon the typical sequence of events in order to play a media title transpires as follows. First, a request to play a media title, 122 is made by an A/V device 83 (FIG. 4) or a viewer via a Network Gateway 80 (FIG. 4) or any other data entry device, such request being delivered to the control server 84–86 from the Network Gateway 80 along communication path 81. The control server(s) 84–86 will then determine if the requested title is available, step 124 of FIG. 5, on any set of the shared loop disks 112 of FIG. 4. If not, the flow exits to the right of decision block 124, whereupon the control server issues a request to the archive server 108 along the control message path 90 of FIG. 4 to load the title onto free disk space in the loops 110. If the title is already available on a loop, the flow exits to the left of decision box 124. It will be noted that the archive server 108 can double as a hot standby to A/V servers 94–106 if necessary.

Next, the control server 84–86 selects an A/V server 94–108 to play the request, 128, balancing the workload across all of the A/V servers. Because the A/V servers are connected to all of the disks 112 via the shared loop architecture of loops 110, any A/V server may be selected by the control server at any time to effect such playing, thereby making load balancing easier.

The control server 84–86 issues a play request, 130, to the selected A/V server 94–108 utilizing the control message path 90 (or redundant control path backup 92). The control message path 90 is preferably redundant, although implementations may vary (e.g., Ethernet, FDDI, or Token-Ring paths would be equally acceptable).

Continuing with FIG. 5, the particular A/V server selected at step 128 thereafter completes a connection, 132, to the requesting A/V device 83 via the isochronous network 88, if such a connection has not already been established previously. This selected A/V server will then locate the first two blocks of media data (e.g., the title data) on the shared loop disk drives 112, and will pre-fetch them both into the selected server's memory, shown at step 134. Next, this A/V server will output the first block of the media data via an I/O adapter (e.g., an ATM adapter in the server, although not necessarily an ATM adapter) which is connected to the requesting A/V device 83. This step is shown as step 136 in FIG. 5.

Next, a check may be made of the integrity of the ensuing data transfer, 138. The selected A/V server, control server 84–86, and communications adapter in the server jointly may make checks to ensure that the media data flows to the selected A/V device 83 without gaps, pauses, or the introduction of unacceptable excessive noise or jitter. Next, the selected A/V server will pre-fetch successive title data blocks into its memory, 140, prior to their being required by the A/V device 83. The access pattern is preferably essentially random across multiple disks 112 and within each such disk.

Finally, when the last media block has been played, the title play is ended, whereupon connection to the A/V device 83 is disconnected, 142. A return 144 is then issued back to the calling program.

A summary of several important features and advantages of the system herein described now follows. First, it has been noted that each disk 112 is connected to each A/V server 94–108 via one or more shared communication loops shown collectively at reference numeral 110 of FIG. 4, such loops being implemented via SSA or FC-AL architecture and standards. Each media selection or title, because of the foregoing design, may be directly accessible by every A/V server 94–108 in the cluster or clusters of server computers due to this shared disk loop architecture. Media titles may be randomly dispersed across many such disks 112, thereby facilitating individual titles being played by many simultaneous viewers.

Still further, the archive server 108 may load new titles directly onto the shared loop disks 112 without adding additional workload to any of the active A/V servers 95–106, thereby enhancing the chances of a high quality playback. By using a relatively large archive server 108 with triple SSA or FC-AL loop adapters, it may be advantageous to provide not one shared loop cluster as shown in FIG. 4, but rather three independent A/V shared-loop clusters which may be interconnected, thereby reducing archive device, robot, and media costs per upload. Moreover, the archive server 108 itself can assume the workload of a failed A/V node in the cluster, thereby acting as a hot standby for up to three interconnected clusters. In such eventuality, the archive upload should nevertheless be delayed long enough to correct any A/V server problem. The programs executing in the control servers 84–86 desirably may also support multiple control and data path interconnected clusters (e.g., clusters of clusters) for load leveling and scaling to a larger number of A/V playbacks. For example, cost performance studies have shown that disk sharing by 8–16 A/V servers may amortize shared disk cost enough so that additional costs per stream are dominated by non-shared system cost. Accordingly, currently there may be little economy in scaling clusters beyond 16 nodes.

Similarly, cost comparisons have indicated that currently shared-loop architecture costs considerably less per play than comparable architectures using switch-attached disk drives (FIG. 2) or switch-attached computers with local disk drives (FIG. 1). The loop switching in accordance with the teachings of the invention effectively provides much cheaper switches and is more cost effective in part because the adapters powered and supported by the A/V server 94–108 themselves and the disk logic effect the switching and the interaction between play streams is small. In currently feasible implementations, single shared-loop clusters may readily be scaled up to handling on the order of 1,000 to 5,000 3 megabyte per second video play streams with only 16 A/V servers. Moreover, clusters of such shared loop clusters 110 may be scaled to support nominally up to 25,000 streams if desired, assuming suitable switching devices for the play streams. Up to three such clusters can thereby share expensive archive server and media costs, thereby further reducing the cost per upload.

The invention admits to yet additional benefits as well. The archive server 108 may load new titles directly onto the shared-loop disks 112 without adding substantial workload to any of the active A/V servers 94–106, thereby enhancing the probability of high quality playback which is highly desirable in commercial video-on-demand settings. Because all nodes are connected to all disks and titles may be spread across many or even all disk drives, suddenly popular, e.g., "hot" titles may not cause transient system overload on any single server or disk drive.

Still further, replication of data across multiple loops, plus attachment of each A/V server 94–108 to each of such loops results in the fact that disk or loop failure will have low impact on system play performance. Still further, as noted, storage cost is a dominant factor in overall cost per played title for many A/V applications. The invention contemplates collection by the control servers of view frequency per title data. This data may then be used to optimize shared-loop bandwidth and reduce data replication significantly. Still further, dynamic balancing of media title requests across disks 112 is not required unless frequency of play optimization is desired and utilized.

With the foregoing in mind regarding the scalability of the system, in some instances a multimedia datastream providing system may be required which can readily support a larger number of datastreams than that of the system previously depicted. Such a system with a scaled up capability is shown in the functional block diagram of FIGS. 6A and 6B.

Figure 6A:
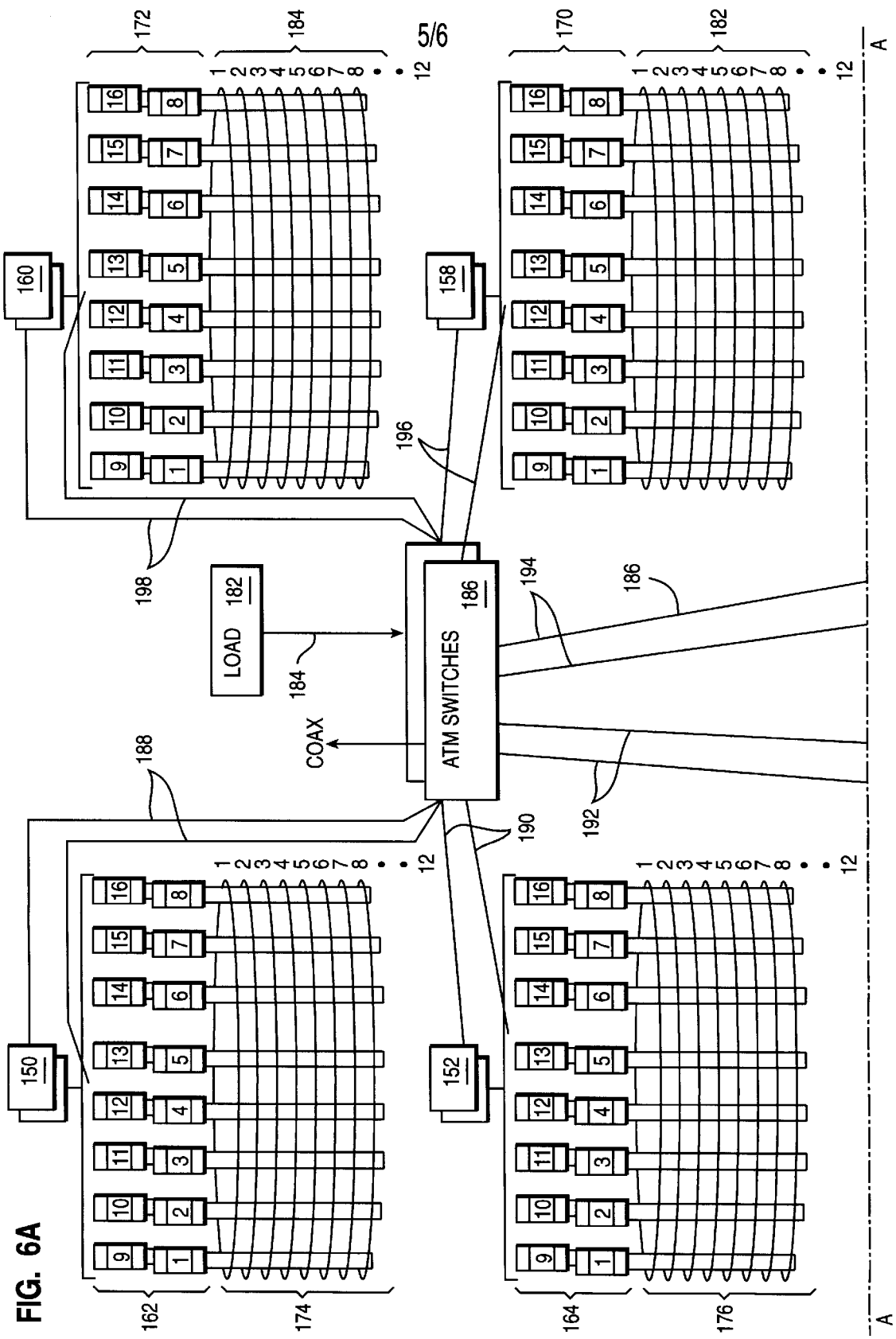

Turning to FIGS. 6A and 6B in greater detail, it will be seen that a cluster of clusters of the multimedia system previously described are shown, for convenience graphically disposed about a high speed ATM switch 186. Taking one of the clusters shown in the upper left hand corner of FIGS. 6A and 6B approximately in the "ten o'clock" position, this cluster will be recognized as being substantially similar to the previously described cluster of A/V servers. Moreover, it will be noted that this cluster will essentially be replicated as shown in the figure many time over. Specifically, the first cluster discussed will include a control server subsystem 150 (typically comprised of the previously described two control servers for high availability reasons); a plurality of A/V servers 162, and a shared loop architecture data storage subsystem 174. The A/V servers 162 and control server subsystem 150 are interconnected to the ATM switch 186 through the interconnections 188. This first cluster, it will be observed is interconnected essentially similarly to the previously described cluster in the sense that the plurality of A/V servers 162 (16 in total in the embodiment shown in FIG. 6) will be interconnected to the shared loop architecture data system 174 so that any of the 16 A/V servers 162 may have substantially equal access to any of the disks on the shared loop architecture system 174.

This architecture of the cluster just described will be seen replicated for example in the next cluster moving counterclockwise in the FIGS. 6A and 6B. Thus, in the next cluster, similarly a control server subsystem 152 is provided, with a plurality of A/V servers 164, and a plurality of disk drives arranged in the shared loop architecture shown at reference numeral 176, such components being in communication with the ATM switch 186 through interconnections 190.

In like manner, continuing counterclockwise around the clusters in FIGS. 6A and 6B, each following cluster will, in like manner, include, respectively, a control server subsystem 154, 156, 158 and 160. Each cluster will also include a corresponding plurality of A/V servers 166, 168, 170, 172, respectively. Each such cluster will further include its corresponding plurality of disk drives arranged in the familiar shared loop architecture, shown at reference numerals 178, 180, 182, 184. The components of each cluster will be in communication through the ATM switches 186 through their respective interconnections, 192, 194, 196, 198.

Still continuing with FIGS. 6A and 6B, one of the control server subsystems desirably will also provide the function of a master control server, such as the control server subsystem 156. The purpose of the master control subsystem is as follows. When a request for a datastream load 182 is transferred along line 184 to the ATM switch 186 and thence to the master control server subsystem 156 along connection 186, this master control server will serve the purpose of then assigning this request for a datastream to a particular one of the multiple clusters in FIGS. 6A and 6B. Accordingly this assignment will be transmitted from the master control server 156 along line 186 through the ATM switch 186 to the appropriate cluster so as to balance the load. This cluster will then service the datastream request in a similar manner to that previously described with respect to an individual cluster such as that shown in FIG. 4. In a representative embodiment, the ATM switch 186 may take the form of an OC12 switch well known in the art which has a capacity of four times an OC3 switch shown in the previous figures so as to handle the increased throughput of the 16 nodes/cluster and multiple clusters of FIGS. 6A and 6B. By provision of the system shown in FIGS. 6A and 6B, 16 A/V servers on each cluster and provision for multiple clusters significantly amortizes the cost of the disk storage per stream. It should be readily appreciated that at some point, for a given cluster, a point of diminishing returns is reached where the shared loop ring for a given cluster is essentially "milked" for what it is worth since the most expensive resources are the shared disks whereby there is very little point to adding yet an additional processor beyond the 16, for example, illustrated with each cluster in FIGS. 6A and 6B. In other words, with the appropriate number of processors, the faster bandwidth of the interconnect disk drive is taxed to the limit, whereby rather than adding yet another A/V server, it is more beneficial simply to add another entire cluster until the capacity of the switch 186 is taxed beyond its capability. Clusters can be replicated for specialization (broad # titles), for bandwidth (replicated titles on many clusters) or for availability where clusters are exactly paired in content).

While the invention has been shown and described with reference to particular embodiments thereof, it will be understood by those skilled in the art that the foregoing and other changes in form and detail may be made therein without departing from the spirit and scope of the invention.

We claim:

1. A method for providing a large number of datastreams in a multimedia datastream server system comprising:

generating a datastream request;

assigning one of a plurality of clusters of A/V servers to service said request by a master controller in response to said request, each of said clusters being interconnected to a high speed data switch and including:

a plurality of said A/V servers;

a control server subsystem which includes said master controller; and a plurality of storage devices configured in a shared data loop and interconnected to said plurality of A/V servers and said control server subsystem; and servicing said request by said assigned one of said clusters.

2. The method of claim 1 wherein said requested datastream is passed from one of said storage devices in said assigned cluster through a corresponding one of said A/V servers in said cluster to said switch.

3. The method of claim 2 wherein said shared data loop is a serial storage architecture loop or a fiber channel arbitrated loop.

4. The method of claim 3 wherein for each said loop, each of said storage devices in said each loop has substantially equal access to any of said A/V servers interconnected to said loop.

5. An apparatus for providing a large number of datastreams in a multimedia datastream server system comprising:

means for generating a datastream request;

a plurality of high speed data switches;

means for assigning one of a plurality of clusters of A/V servers to service said request by a master controller in response to said request, each of said clusters being interconnected to one of said high speed data switches; including:

a plurality of said A/V servers;

a control server subsystem which includes said master controller; and a plurality of storage devices configured in a shared data loop and interconnected to said plurality of A/V servers and said control server subsystem; and means for servicing said request by said assigned one of said clusters.

6. The apparatus of claim 5 wherein said requested datastream is passed from one of said storage devices in said assigned cluster through a corresponding one of said A/V servers in said cluster to said switch.

7. The apparatus of claim 5 wherein said shared data loop is a serial storage architecture loop or a fiber channel arbitrated loop.

8. The apparatus of claim 7 wherein for each said loop, each of said storage devices in said each loop has substantially equal access to any of said A/V servers interconnected to said loop.

\* \* \* \* \*